(12) United States Patent
Pratt et al.

(10) Patent No.: US 7,540,439 B2
(45) Date of Patent: Jun. 2, 2009

(54) REACTIVE MILLING PROCESS FOR THE MANUFACTURE OF A HYDROGEN STORAGE ALLOY

(75) Inventors: Allin Sidney Pratt, Wallingford (GB); Oliver Gutfleisch, Dresden (DE)

(73) Assignees: Johnson Matthey Public Limited Company, London (GB); Liebniz-Institut fur Festkörper-und Werkstoffforschung Dresden, Dresden (DE)

(*) Notice: Subject to any disclaimer, the term of this patent is extended or adjusted under 35 U.S.C. 154(b) by 667 days.

(21) Appl. No.: 10/524,887

(22) PCT Filed: Aug. 1, 2003

(86) PCT No.: PCT/GB03/03318

§ 371 (c)(1),
(2), (4) Date: Sep. 6, 2005

(87) PCT Pub. No.: WO2004/016817

PCT Pub. Date: Feb. 26, 2004

(65) Prior Publication Data

US 2006/0108457 A1 May 25, 2006

(30) Foreign Application Priority Data

Aug. 16, 2002 (GB) ................................. 0219112.0

(51) Int. Cl.
*B02C 25/00* (2006.01)
(52) U.S. Cl. ....................................................... 241/30
(58) Field of Classification Search ................... 241/30, 241/24
See application file for complete search history.

(56) References Cited

U.S. PATENT DOCUMENTS

| 3,785,801 | A | * | 1/1974 | Benjamin | ..................... 75/255 |
| 4,798,718 | A | | 1/1989 | Bogdanovic | |
| 6,165,643 | A | | 12/2000 | Doyle et al. | |

FOREIGN PATENT DOCUMENTS

WO  WO-96/23906  8/1996

OTHER PUBLICATIONS

F. von Zeppelin et al., "Hydrogen desorption kinetics of nanostructured MgH$_2$ composite materials," *Journal of Alloys and Compounds*, vols. 330-332, Jan. 17, 2002, pp. 723-726.
A. Zaluska et al., "Nanocrystalline magnesium for hydrogen storage," *Journal of Alloys and Compounds*, vol. 288, Issues 1-2, Jun. 29, 1999, pp. 217-225.
S. Orimo et al., "Notable Hybriding Properties of a Nanostructured Composite Material of the Mg$_2$Ni-H System Synthesized by Reactive Mechanical Grinding," *Acta Mater.*, vol. 45, No. 1, 1997, pp. 331-341.
L Zaluska et al., "Hydrogen absorption in nanocrystalline Mg$_2$Ni formed by mechanical alloying," *Journal of Alloys and Compounds*, vol. 217, Issue 2, Feb. 1, 1995, pp. 245-249.

* cited by examiner

*Primary Examiner*—Bena Miller
(74) *Attorney, Agent, or Firm*—RatnerPrestia

(57) ABSTRACT

A process for the manufacture of a hydrogen storage material comprises comminuting a source of magnesium under a reducing atmosphere for a time sufficient to produce particles of a required particle size and crystallite size. At least one reducible PGM compound is introduced and substantially reduced during comminution such that it is distributed substantially at the surface of the particles.

10 Claims, 2 Drawing Sheets

REACTIVE MILLING PROCESS FOR THE MANUFACTURE OF A HYDROGEN STORAGE ALLOY

This application is the U.S. national phase application of PCT International Application No. PCT/GB2003/003318, filed Aug. 1, 2003, and claims priority or British Patent Application No. 0219112.0, filed Aug. 16, 2002.

FIELD OF THE INVENTION

This invention relates to a process for the production of hydrogen storage materials and to materials so produced, particularly to a process for the production of hydrogen storage materials based on magnesium and magnesium alloys.

BACKGROUND OF THE INVENTION

Metal hydrides are of great interest as energy storage media. Hydrides of magnesium and magnesium alloys are particularly attractive as they combine potentially high hydrogen storage capacities, 7.6 wt % for pure $MgH_2$, with low cost and convenient hydride heats of formation. Practical application is however limited due to poor sorption kinetics. For example, conventional hydrogenation of magnesium requires prolonged treatment at temperatures of 300° C. and above.

Recent studies by Zaluska, *Jn. of Alloys and Compounds*, 288, (1999), p. 217-225, have shown that the use of high energy ball milling can improve the hydrogen absorption kinetics of magnesium by promoting a nanocrystalline microstructure. Such processing increases the surface area of the metal so that hydride formation is not limited to the surface regions of the metal and also introduces numerous structural defects which facilitate hydrogen penetration. It is important that the milling process is performed under an inert atmosphere, e.g. argon, to prevent oxidation of the magnesium. Absorption kinetics can be improved such that the time for hydrogenation at 300° C. is reduced to a few minutes. Nonetheless, this temperature is still too high for many practical purposes. Other methods of enhancing sorption kinetics have included the use of additives and catalysts. For example, the addition of small amounts of 3d transition metals, such as Ti, V, Mn, Fe or Ni has been reported to allow hydrogen absorption at room temperature and subsequent desorption at 235° C. albeit under reduced pressure.

WO 9623906 describes the use of high energy ball milling to produce nanocrystalline magnesium and magnesium alloy powders with good hydrogen sorption characteristics. Clusters of platinum group metals, Pd, Pt, Ru, Rh, Ir and Os (referred to hereinafter as PGM) may be attached to the surface of the magnesium particles to catalyse the absorption of hydrogen. The PGM is introduced towards the end of the milling process. The materials are described as being able to absorb and desorb hydrogen at room temperature and under both low and high pressure however, the specification only contains examples of experiments conducted at 230° C. and above. The importance of milling under an inert atmosphere to prevent oxidation of the powders is again stressed. The process has two main drawbacks; firstly the PGM are introduced in metallic (elemental) form which, when finely divided, are extremely pyrophoric, and secondly the processed material still has to be charged with hydrogen before it can be used. This requires extra plant in the form of a hydrogenation vessel, and also equipment to transport the material from the milling apparatus and to the point of use whilst guarding against contamination.

Orimo et al., *Acta mater.* 45, (1997), p. 331-341, describe the milling of $Mg_2Ni$ under an atmosphere of hydrogen to produce a nano-structured magnesium-nickel hydride. Care was taken to ensure that no other elements were introduced during processing so avoiding impurity effects on the hydriding and structural properties of the materials.

SUMMARY OF THE INVENTION

A desirable aim would be to avoid the use of hazardous, finely divided PGM and produce a hydrogen storage material, charged with hydrogen and ready for use without further processing. This is the aim the present invention sets out to achieve.

In accordance with the present invention, a process for the manufacture of a hydrogen storage material comprises comminuting a source of magnesium under a reducing atmosphere for a time sufficient to produce particles of a required particle size and crystallite size, and introducing at least one reducible PGM compound; wherein the at least one PGM compound is substantially reduced during comminution, and distributed substantially at the surface of the particles.

BRIEF DESCRIPTION OF THE INVENTION

The invention is described below by way of example only and with reference to the following drawings in which.

Figure 3:
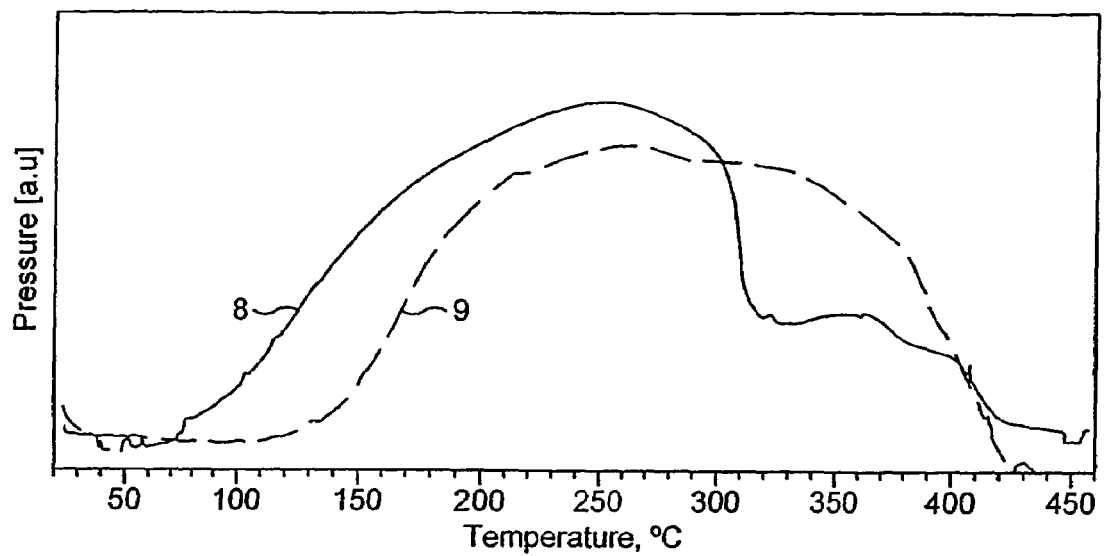
Figure 4:
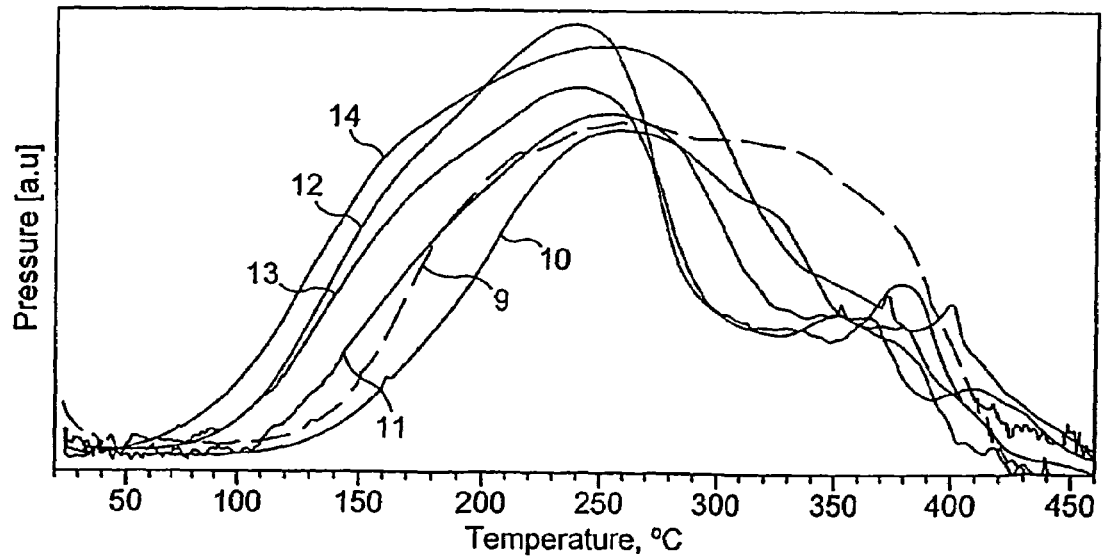

FIG. 3 shows a graph of the desorption of hydrogen from an uncatalysed sample of $Mg_2Ni$ and from a sample of $Mg_2Ni$ co-milled with $PdO \cdot H_2O$ for the final hour of milling time according to the present invention; and, FIG. 4 shows a graph of the desorption of hydrogen from an uncatalysed sample of $Mg_2Ni$ and from samples of $Mg_2Ni$ co-milled with ruthenium black for the final 10 hours, 2 hours, 1 hour, 30 minutes and 15 minutes of milling time according to the present invention.

DETAILED DESCRIPTION OF THE INVENTION

Preferably, the reducing atmosphere comprises hydrogen. Hydrogen gas may be used either alone or in admixture with an inert gas such as nitrogen or argon. Liquid ammonia may be employed as a source of hydrogen, the ammonia being catalytically cracked into hydrogen and nitrogen prior to use. The process of cracking liquid ammonia to provide hydrogen is well known and provides advantages in terms of safety and cost.

By using a reducing atmosphere, the present invention has significant advantages over known methods such as that of WO 9623906. Hydrogen is introduced into the lattice of the source of magnesium during comminution. The material obtained is thus already fully hydrogenated, requiring no additional processing before use. It is also thought that the brittleness of the source of magnesium is increased by the presence of lattice hydrogen, leading to more efficient comminution and thus smaller particle and crystallite grain size. A further advantage is the ability to use reducible PGM compounds in place of the metals themselves. As stated above, PGM compounds are less hazardous to use. Also they can, in some cases, be significantly cheaper than the corresponding metals, and are easier to provide in fine particle form.

The source of magnesium may comprise magnesium metal itself, magnesium hydride or an alloy or intermetallic compound, or hydrided alloy or hydrided intermetallic compound of magnesium with one or more other metals. Examples of suitable alloys and intermetallic compounds include binary alloys or intermetallic compounds of magnesium with transition metals such as nickel, iron, or manganese. Any alloy or intermetallic compound may be pre-formed e.g. $Mg_2Ni$, or alternatively, the alloying elements may be introduced in admixture with magnesium, the comminution process forming the alloy or intermetallic compound via mechanical alloying. Preferably, the source of magnesium comprises magnesium metal, magnesium hydride, a magnesium-nickel alloy or intermetallic compound or a hydrided magnesium-nickel alloy or intermetallic compound. Mixed sources of magnesium may also be used.

The physical form of the source of magnesium is relatively unimportant provided that it can be broken down to the required particle size during comminution. Powders, grains, filings or other bulk forms may all be used, with powders being preferred.

Preferably, the comminution step is performed using a ball mill and more preferably, a high energy ball mill is used. This introduces considerable amounts of mechanical work into the source of magnesium, reducing both the particle size and the crystallite size. The ratio of the amount of grinding media (balls) to the amount of material to be comminuted can be derived by the skilled man. Suitably, a ratio by weight of media to material of 5 or more is used. Planetary mills, vibratory mills and jet mills are suitable. Alternatively, other known methods of comminution may also be used Although not required in the process of the present invention, mills which allow for additional heating during comminution may be beneficial in some circumstances.

Preferably, the at least one reducible PGM compound is introduced towards the end of the comminution step. This ensures that the PGM compound, and thus its reduced product, remains on or near the surface of the particles. If the PGM compound is introduced too early in the process, there may be sufficient time for diffusion into the bulk of the source of magnesium, which compromises the catalytic effect of the PGM and hence the hydrogen storage ability of the material. The exact stage at which the PGM compound is introduced will differ depending on factors such as the severity of the comminution process and the initial physical form of the source of magnesium. Typically however, when high energy ball milling is used, the PGM compound may be introduced during the final hour of comminution.

Preferably, the source of the at least one reducible PGM compound comprises an oxide, a hydrated oxide, a halide or other salt, or any mixture thereof. Particularly preferred are oxides and hydrated oxides of palladium, e.g. PdO and $PdO.H_2O$, and oxides of ruthenium, e.g. $RuO_2$. Included are species such as ruthenium black and palladium black. Such compounds are readily reduced to the corresponding metals during comminution under hydrogen. Palladium tends to form a thin, discontinuous coating on the particles whereas ruthenium tends to form isolated clusters attached to the particles.

Suitably, the particles have an average particle size of less than 100 μm, more suitably less than 20 μm, and preferably less than 5 μm, for example 1 μm.

It is important that the particles also have a small crystallite size. Preferably, the particles have an average crystallite size of less than 100 nm, more preferably less then 50 nm, for example 30 nm.

Example 1

Preparation of Microcrystalline $MgH_2$

Magnesium powder of mesh size 45 μm and purity 99.8% was loaded into a PARR-reactor. The powder was heated to 400° C. under a hydrogen pressure of 60 bar for 3 hours.

Example 2

Hydrogen Desorption Measurements

All samples prepared as described below were subjected to hydrogen desorption measurements using the following procedure. The samples (approx. 100 mg) were placed in a dynamic vacuum system and heated at a rate of 10° C./min. All samples were handled in a glove box under an atmosphere of purified argon to prevent contamination. Results are shown in FIGS. 1-4.

Comparative Example 1

A P6 planetary ball mill was charged with $MgH_2$ powder as prepared in example 1. The ratio of grinding balls to powder was 13:1 by weight The powder was then milled under hydrogen (99.9% pure) at a pressure of 7 bar for 80 hours.

Comparative Example 2

Comparative Example 1 was repeated except that the mill was charged with $Mg_2Ni$ powder (<250 μm mesh size) instead of $MgH_2$.

Comparative Example 3

A P6 planetary ball mill was charged with $MgH_2$ powder as prepared in example 1 and 0.5 wt % of $PdO.H_2O$ was added. The ratio of grinding balls to powder was 13:1 by weight The powder and metal oxide was then co-milled under hydrogen (99.9% pure) at a pressure of 7 bar for 80 hours.

Figure 1:
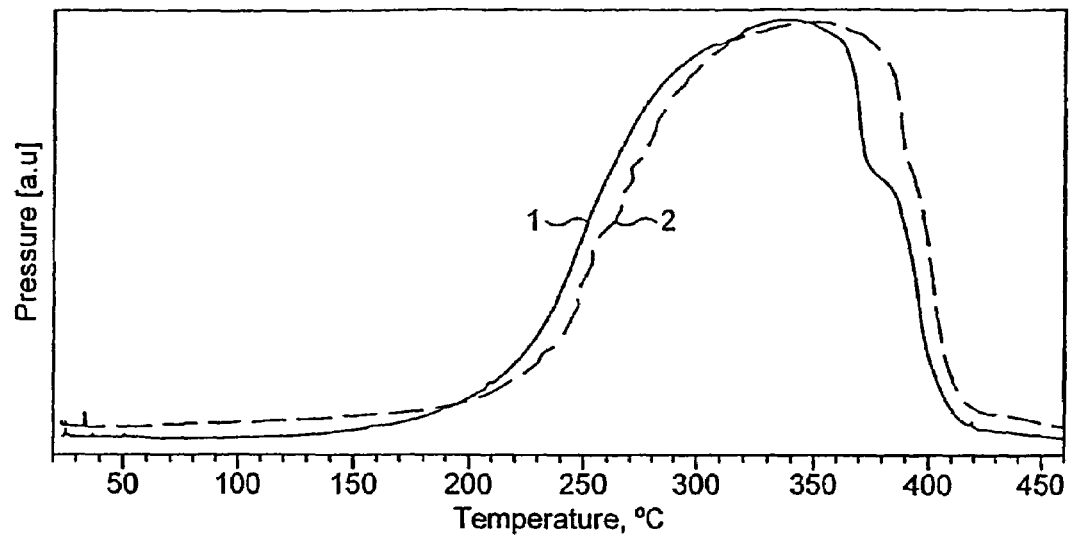
FIG. 1 shows a graph of the desorption of hydrogen from an uncatalysed sample of nano-crystalline $MgH_2$ and from a sample of nano-crystalline $MgH_2$ co-milled with $PdO \cdot H_2O$ for 80 hours and not according to the present invention.

As shown in FIG. 1, there was little difference between the temperature of hydrogen desorption for this sample 1 and that measured for the uncatalysed sample 2 as prepared in Comparative Example 1. This behaviour is attributed to the diffusion of the Pd species into the bulk of the $MgH_2$ powder which compromises the catalytic activity of the material.

Example 4

A P6 planetary ball mill was charged with $MgH_2$ powder as prepared in example 1. The ratio of grinding balls to powder was 13:1 by weight The powder was then milled under hydrogen (99.9% pure) at a pressure of 7 bar for 80 hours. In separate experiments, 1 wt % of ruthenium black was added for the final 10 hours, 2 hours, 1 hour, 30 minutes and 15 minutes of milling.

Figure 2:
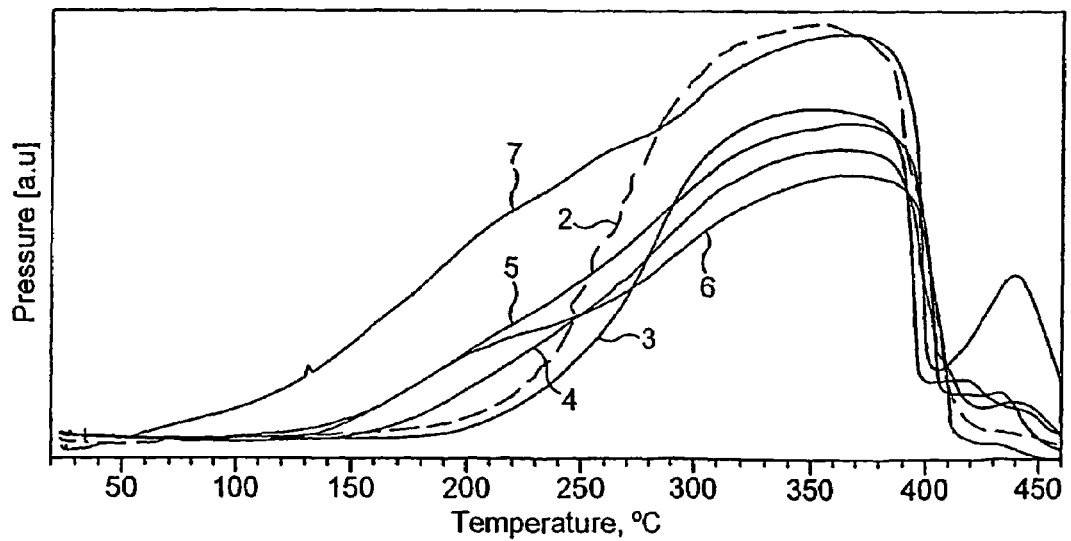
FIG. 2 shows a graph of the desorption of hydrogen from an uncatalysed sample of nano-crystalline $MgH_2$ and from samples of nano-crystalline $MgH_2$ co-milled with ruthenium black for the final 10 hours, 2 hours, 1 hour, 30 minutes and 15 minutes of milling time according to the present invention.

As shown in FIG. 2, desorption of hydrogen from the sample co-milled with ruthenium black for the final 10 hours of milling 3 began at substantially the same temperature as that measured for the uncatalysed sample 2 as prepared in Comparative Example 1. A small reduction in the hydrogen desorption temperature was observed for the sample co-milled for the final 2 hours 4. The samples co-milled for the final hour 5 and the final 15 minutes 6 showed a further reduction in the desorption temperature. The optimum co-milling time for this series of experiments was found to be 30 minutes. This sample 7 reduced the onset of desorption to a temperature below 100° C. which was in excess of 100° C. lower than that found for the uncatalysed sample 2.

Example 5

A P6 planetary ball mill was charged with $Mg_2Ni$ powder (<250 μM mesh size). The ratio of grinding balls to powder was 13:1 by weight The powder was then milled under hydrogen (99.9% pure) at a pressure of 7 bar for 80 hours. 0.5 wt % of $PdO.H_2O$ was added for the final hour of milling.

As shown in FIG. 3, the onset of hydrogen desorption for this sample 8 was approximately 100° C., which was in excess of 50° C. lower than that observed for the uncatalysed sample 9 as prepared in Comparative Example 2.

Example 6

Example 4 was repeated except that the mill was charged with $Mg_2Ni$ powder (<250 μm mesh size) instead of $MgH_2$. Additions of ruthenium black were again performed for the final 10 hours, 2 hours, 1 hour, 30 minutes and 15 minutes of milling in separate experiments.

As shown in FIG. 4, desorption of hydrogen from the sample co-milled with ruthenium black for the final 10 hours of milling 10 was slightly retarded compared to that measured for the uncatalysed sample 9 as prepared in Comparative Example 2. A small reduction in the hydrogen desorption temperature was observed for the sample co-milled for the final 2 hours 11. The samples co-milled for the final hour 12 and the final 30 minutes 13 showed a further reduction in the desorption temperature. A still further reduction was observed for the sample co-milled for the final 15 minutes 14. This sample reduced the onset of desorption to a temperature below 100° C. which was in excess of 50° C. lower than that found for the uncatalysed sample 9.

The invention claimed is:

1. A process for the manufacture of a hydrogen storage material, the process comprising comminuting a source of magnesium under a reducing atmosphere for a time sufficient to produce particles of a required particle size and crystallite size, and introducing at least one reducible platinum group metal (PGM) compound; wherein the at least one PGM compound is substantially reduced in oxidation state during comminution, and is distributed substantially at the surface of the particles.

2. A process according to claim 1, wherein the reducing atmosphere comprises hydrogen.

3. A process according to claim 1, wherein the source of magnesium is selected from the group consisting of magnesium metal, magnesium hydride, an alloy of magnesium metal with one or more other metals, an intermetallic compound of magnesium metal with one or more other metals, a hydrided alloy of magnesium metal with one or more other metals and a hydrided intermetallic compound of magnesium with one or more other metals.

4. A process according to claim 1, wherein the comminution step is carried out using a ball mill.

5. A process according to claim 1, wherein the at least one reducible PGM compound is introduced towards the end of the comminution step.

6. A process according to claim 1, wherein the at least one reducible PGM compound is selected from the group consisting of an oxide, a hydrated oxide, a halide, another salt and any mixture thereof.

7. A process according to claim 1, wherein the at least one reducible PGM compound is selected from the group consisting of PdO, $PdO.H_2O$, palladium black, ruthenium black and $RuO_2$.

8. A process according to claim 1, wherein the particles have an average particle size of less than 100 μm.

9. A process according to claim 1, wherein the particles have an average crystallite size of less than 100 nm.

10. A process according to claim 8, wherein the particles have an average crystallite size of less than 100 nm.

* * * * *